(12) United States Patent
Duran

(10) Patent No.: US 10,826,553 B1
(45) Date of Patent: Nov. 3, 2020

(54) WEARABLE APPARATUS FOR HOLDING A DEVICE

(71) Applicant: Jeramiah Duran, Kansas City, MO (US)

(72) Inventor: Jeramiah Duran, Kansas City, MO (US)

(*) Notice: Subject to any disclaimer, the term of this patent is extended or adjusted under 35 U.S.C. 154(b) by 0 days.

(21) Appl. No.: 16/547,829

(22) Filed: Aug. 22, 2019

(51) Int. Cl.
*H04B 1/3888* (2015.01)
*A45F 5/00* (2006.01)

(52) U.S. Cl.
CPC ............. *H04B 1/3888* (2013.01); *A45F 5/00* (2013.01); *A45F 2005/008* (2013.01)

(58) Field of Classification Search
CPC ... A45F 5/00; A45F 2005/008; H04B 1/3888; H04B 1/385
See application file for complete search history.

(56) References Cited

U.S. PATENT DOCUMENTS

| | | | | |
|---|---|---|---|---|
| 3,442,427 A * | 5/1969 | Arnell | ........................ | A45F 3/08 224/261 |
| 8,554,292 B1 * | 10/2013 | Alsaffar | ................... | H04M 1/04 455/575.4 |
| 2009/0294495 A1 * | 12/2009 | Moreau | ..................... | A45F 5/00 224/219 |
| 2010/0240476 A1 * | 9/2010 | Des Roches | ....... | A63B 69/0024 473/423 |
| 2012/0325873 A1 * | 12/2012 | Stocco | ..................... | A45F 5/00 224/267 |
| 2015/0201266 A1 * | 7/2015 | Abreu | .................. | H04R 1/1033 381/374 |
| 2015/0318885 A1 * | 11/2015 | Earle | ...................... | H04B 1/385 455/575.6 |
| 2018/0256888 A1 * | 9/2018 | Wingeier | ............. | A61B 5/0478 |

* cited by examiner

*Primary Examiner* — George Eng
*Assistant Examiner* — Hung K Du
(74) *Attorney, Agent, or Firm* — Sanchelima & Associates, P.A.; Christian Sanchelima; Jesus Sanchelima

(57) ABSTRACT

A wearable apparatus for holding a device is disclosed herein. The apparatus comprises at least one wrist strap and a mounting base supported on the at least one wrist strap. A holder base is coupled to the mounting base. The holder base is configured to hold the device. The holder base is coupled to the mounting base by either attaching to the mounting base or by being suspended away from mounting base. There is further at least one retracting cable spool for facilitating the suspension of the holder base away from the mounting base. Additionally, there is at least one connector disposed on the holder base for facilitating connection of cable from the at least one retracing cable spool. If a user should accidently drop the device the apparatus prevents the device from hitting the ground, thereby preventing any accidental damage to the device.

9 Claims, 4 Drawing Sheets

US 10,826,553 B1

WEARABLE APPARATUS FOR HOLDING A DEVICE

BACKGROUND OF THE INVENTION

1. Field of the Invention

The present disclosure relates a wearable apparatus for holding a device. In particular, the present disclosure relates to a wearable apparatus that can be used to hold a device such as a smartphone while preventing the device from accidentally falling down.

2. Description of the Related Art

Holder devices for holding the devices are known in the art. Some of these devices are designed to hold the device either in a horizontal or a vertical orientation to allow the user to keep their hands free for performing any other manual chores. However, none of the holders are known to prevent the accidental falling of the devices when the device is being held in the user's hands.

Several designs for holder apparatuses have been designed in the past. None of them, however, are known to have a simple configuration, which prevents the accidental falls of devices such as a smartphone, while the smartphone is being used or held in the hands of the user, thereby avoiding the damage to the smartphone, such as, for example, cracking of the display screen. Further, none include a cellular telephone holder comprising a wrist strap, a rotatable phone support, and elastic straps for securing the corners of a cellular telephone to the rotatable wrist strap.

Applicant believes that a related reference corresponds to U.S. Patent Publication No. 20150195392 filed by Israel Nissenbaum. The Nissenbaum reference discloses a wearable cell phone holder enabling stable, hands-free viewing of cell phone screen while the cell phone is supported on the viewer's torso and a method by which a cell phone is utilizable for computer functions. The wearable cell phone holder comprises a rigid flat base element to which a short stand element is attached such as by vacuum attachment. The stand element has an adjustably positioned clamp for holding the cell phone in a wearer viewable position. A lanyard is attached to a proximal side of the base element to support the clamped cell phone by the viewer's neck with the base element resting on the viewer's torso. However, the holder disclosed in the Nissenbaum reference fails to disclose any means that prevent the accidental fall of a device such as a smartphone, while the smartphone is being used by a user.

Applicant believes that another related reference corresponds to U.S. Patent Publication No. 20070164987 filed by Christopher Graham. The Graham reference discloses an apparatus for supporting an electronic device in front of the body of a user. The apparatus comprises a chest-engaging member, a first back-engaging member and at least one resiliently deformable first arm coupling the chest-engaging member to the first back-engaging member. Resilient deformation of the at least one first arm biases the chest-engaging member and the first back-engaging member toward one another. However, the apparatus disclosed in the Graham reference fails to disclose any means that prevent the accidental fall of a device such as a smartphone, while the smartphone is being used by a user.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a wearable apparatus for holding a device, which has a simple configuration.

It is another object of the present invention to provide a wearable apparatus for holding a device, which prevents the accidental falls of devices such as a smartphone, while the smartphone is being used or held in the hands of the user.

It is another object of the present invention to provide a wearable apparatus for holding a device, which avoids the damage to the smartphone being used by a user, such as, for example, cracking of the display screen caused due to accidental falls.

Further objects of the invention will be brought out in the following part of the specification, wherein detailed description is for the purpose of fully disclosing the invention without placing any limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
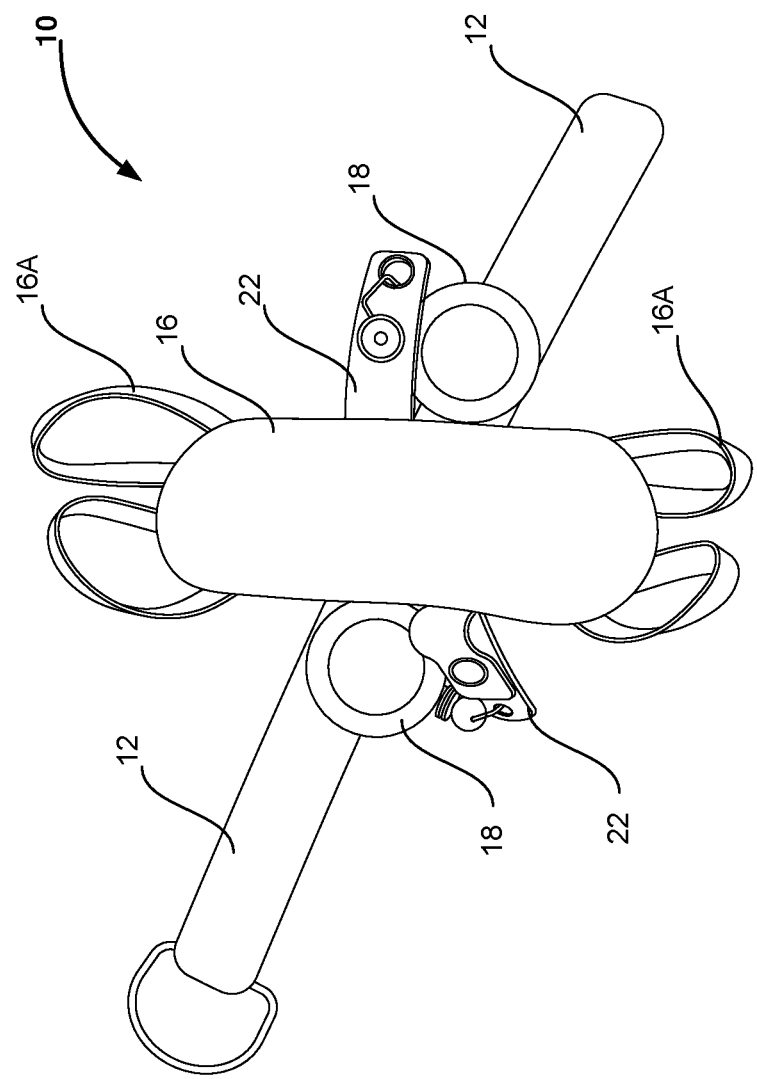
FIG. 1 illustrates a schematic view of a wearable holder apparatus 10, in accordance with an embodiment of the present invention, wherein apparatus 10 comprises at least one wrist strap 12, a mounting base 14 supported on wrist strap 12, a holder base 16 coupled to mounting base 14, and at least one retracting cable spool 18 for facilitating suspension of holder base 16 away from mounting base 14.

Referring now to FIGS. 1 through 4, where the present invention is generally referred to with numeral 10, it can be observed that a holder apparatus 10 for holding a device, in accordance with an embodiment of the present invention, comprises at least one wrist strap 12, a mounting base 14 supported on at least one wrist strap 12, and a holder base 16 coupled to mounting base 14, at least one retracting cable spool 18 for facilitating suspension of holder base 16 away from mounting base 14.

Holder apparatus 10 comprises at least one wrist strap 12. In accordance with an embodiment of the present invention, at least one wrist strap 12 is a resilient strap made of an elastic material. In accordance with an embodiment of the present invention, at least one wrist strap 12 may include a fastening means such as a buckle or hook and loop straps for securing at least one wrist strap 12 to the wrist of the user. Other means as known in the art may be suitable for securing the present invention to the wrist of a user.

Holder apparatus 10 comprises mounting base 14. Mounting base 14 is supported on supported on at least one wrist strap 12. Mounting base 14 is the portion of holder apparatus 10 to which holder base 16 can be attached. In accordance with an embodiment of the present invention, mounting base 14 comprises fastening means 14A, such as press-fit buttons for facilitating attachment of holder base 16 to mounting base 14. Fastening means 14A are to receive male fastening means 14B. It should be understood that mounting base 14 may include means for fastening other than fastening means 14A such as snap buttons, adhesives, hook and loop straps, rings, or other fasteners as known in the art. However, mounting base 14 can also include other means for facilitating attachment to holder base 16, including but not limited to, hook and loop straps. It should be understood that mounting base 14 can also include other means for facilitating attachment to holder base 16 that allow for vertical or horizontal orientation of the present invention. Thereby allowing a user to holder a device 20 either vertically or horizontally in the present invention.

Holder apparatus 10 comprises holder base 16. Holder base 16 is the portion of holder apparatus 10 that holds a device therein. In accordance with an embodiment of the present invention, device can be a smartphone or any other mobile device. Holder base 16 comprises holding means 16A configured at corners thereof. In accordance with an embodiment of the present invention, holding means 16A are resilient bands that resiliently fit over the corners of device 20, thereby holding device 20 securely therewithin. It may be suitable for device to be held in place by other means for holding other than holding means 16A such as snap buttons, adhesives, hook and loop straps, rings, straps or other fasteners as known in the art.

Holder apparatus 10 further comprises at least one retracting cable spool 18 for facilitating suspension of holder base 16 away from mounting base 14. At least one retracting cable spool 18 housing a cable. Retracting cable spools 18 are disposed on at least one wrist strap 12. Holder apparatus 10 further comprises connectors 22 disposed on holder base 16 for facilitating connection of cable from retracing cable spools 18 to holder base 16.

The operative configurations of apparatus 10 are hereinafter described. In a first operative configuration, holder base 16 is attached to mounting base, as seen in FIG. 1. In this configuration, device 20 can be placed within holder base 16, when the user is not using device 20.

Figure 2:
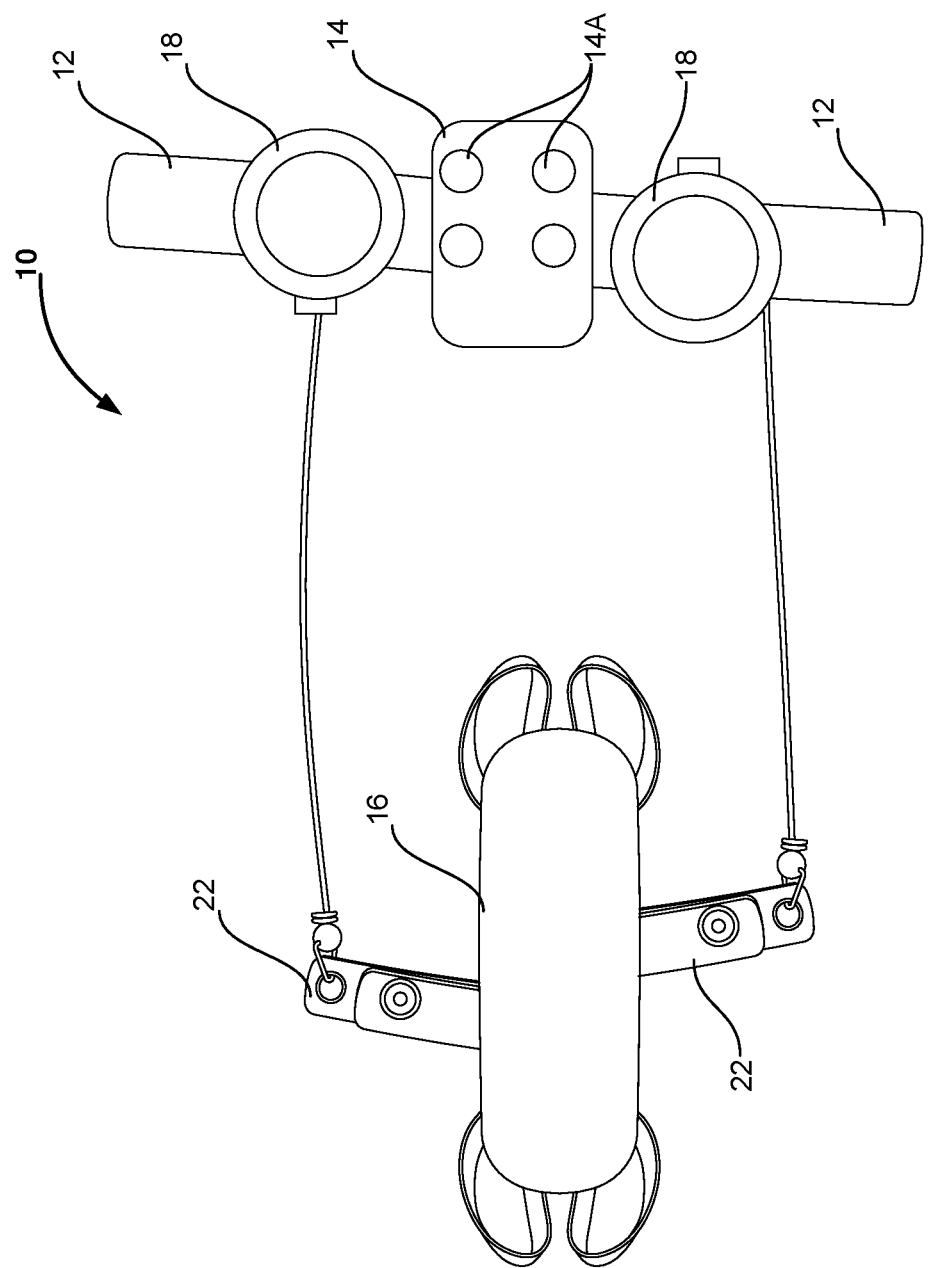
FIG. 2 illustrates a schematic view of a wearable holder apparatus 10, in accordance with an embodiment of the present invention, wherein holder base 16 is suspended away from mounting base 14 via cable spool 18 and connectors 22.
Figure 3:
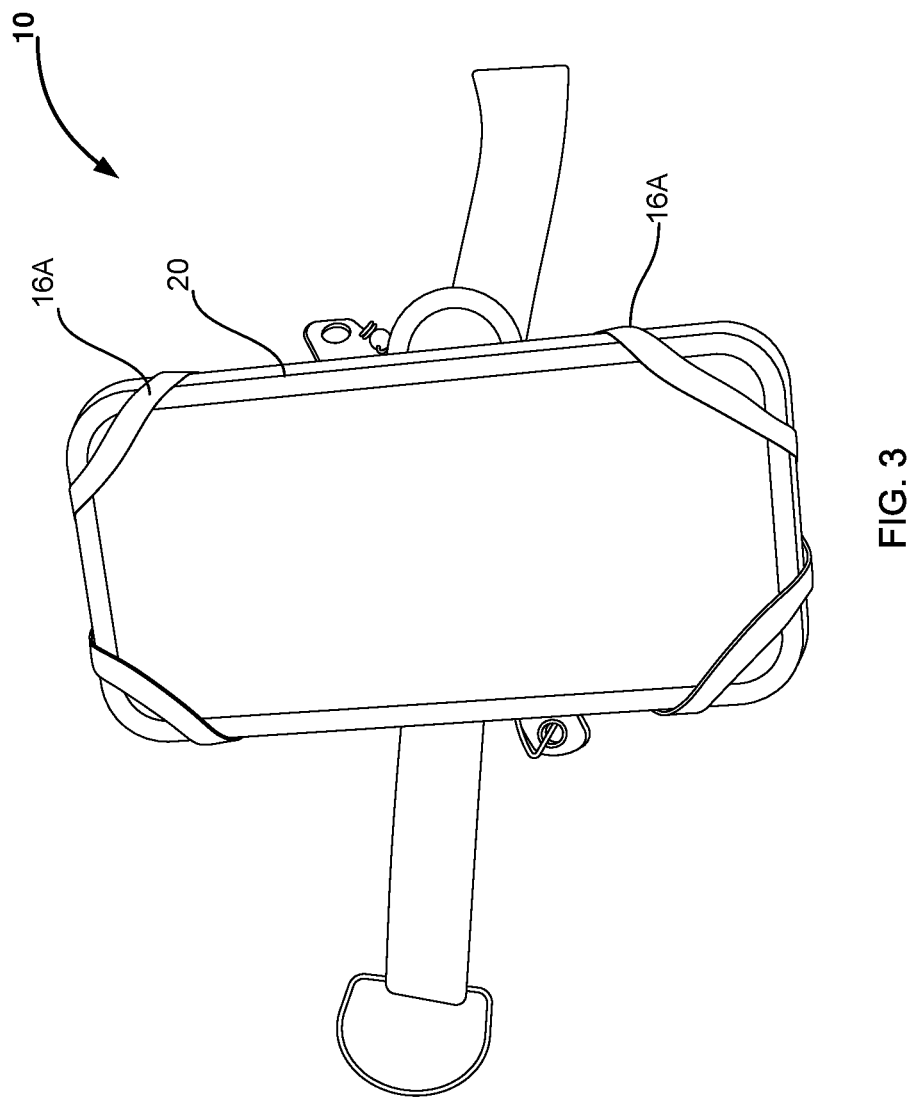
FIG. 3 illustrates a schematic view of a wearable holder apparatus 10, in accordance with an embodiment of the present invention, wherein a device 22 is mounted on holder base 16.
Figure 4:
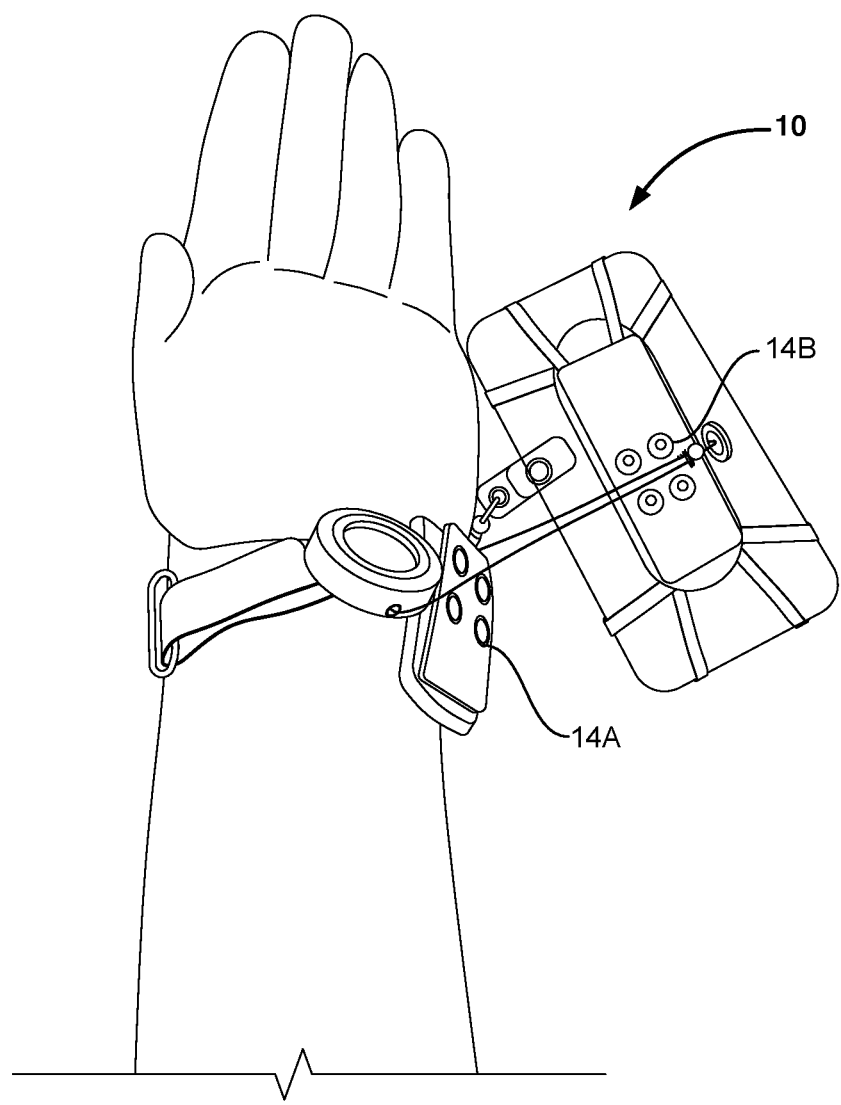
FIG. 4 illustrates a schematic view of a wearable holder apparatus 10, in accordance with an embodiment of the present invention, wherein apparatus 10 is worn on wrist of user.

In a second operative configuration, as seen in FIG. 2, holder base 16 is suspended away from mounting base 14 by means of retracting cable spools 18 and connectors 22. This is the configuration where an accidental fall of device 20 occurs while device 20 is placed within holder base 16. Holder base 16, which has device 20 held therewithin, is suspended in this configuration, thereby preventing the accidental fall and the damage to the device. Holder apparatus 10 may be fully customizable as per the needs and desires of a user. As such a user may use different attaching means to attach the present invention to their wrist. As well a user may use different attaching means to hold device 20 onto the present invention. It should be understood that a user may rotate device 20 vertically or horizontally, depending on how the user desires to view device 20 while device 20 is mounted and attached to a user's wrist.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a wearable holder apparatus, said apparatus comprising:
   a. a device being a mobile device;
   b. at least one wrist strap;
   c. a mounting base supported on said at least one wrist strap, wherein said at least one wrist strap further includes a first cable spool housing mounted to next to a first side of said at least one wrist strap, a second cable spool housing mounted next to a second side of said at least one wrist strap, wherein said mounting base has a rectangular shape and is mounted between said first cable spool housing and said second cable spool housing, wherein said first cable spool housing and said second cable spool housing each house a cable therein; and
   d. a holder base coupled to said mounting base, said holder base configured to hold said device, wherein said holder base includes a first edge and a second edge, a first connector having a rectangular shape protruding from said first edge, wherein said first connector includes a first opening located on a distal end of said first connector, wherein said first opening receives said cable from said first retractable spool housing, a second connector having a rectangular shape protruding from said second edge, wherein said second connector includes a second opening located on a distal end of said second connected, wherein said second opening receives said cable from said second retractable spool housing.

2. The system according to claim 1, wherein said mounting base has fastening means configured thereon to facilitate attachment of said holder base thereto, said fastening means adapted to receive male fastening means therein.

3. The system according to claim 2, wherein said fastening means is press-fit buttons.

4. The system according to claim 1, wherein said holder base has holding means configured at corners thereof.

5. The system according to claim 4, wherein said holding means are resilient bands affixed to the corners of said holder base.

6. The system according to claim 1, wherein said device is a smartphone.

7. The system of claim 2, wherein said fastening means are one of snap buttons, adhesives, hook and loop straps, rings or straps.

8. The system of claim 4, wherein said holding means are one of snap buttons, adhesives, hook and loop straps, rings or straps.

9. A system for wearable holder apparatus, said apparatus comprising:
   a. a device, said device being a smart phone;
   b. at least one wrist strap;
   c. a mounting base supported on said at least one wrist strap;
   d. a holder base coupled to said mounting base, said holder base configured to hold said device, said holder base being coupled to said mounting base by either attaching to said mounting base or by being suspended away from mounting base, said holder base has holding means configured at corners thereof, wherein said holding means are resilient bands affixed to the corners of said holder base, said holding means adapted to receive male fastening means therein;

e. a first cable spool housing mounted to next to a first side of said at least one wrist strap, a second cable spool housing mounted next to a second side of said at least one wrist strap, wherein said mounting base has a rectangular shape and is mounted between said first cable spool housing and said second cable spool housing, wherein said first cable spool housing and said second cable spool housing each house a cable therein;

f. wherein said holder base includes a first edge and a second edge, a first connector having a rectangular shape protruding from said first edge, wherein said first connector includes a first opening located on a distal end of said first connector, wherein said first opening receives said cable from said first retractable spool housing, a second connector having a rectangular shape protruding from said second edge, wherein said second connector includes a second opening located on a distal end of said second connected, wherein said second opening receives said cable from said second retractable spool housing; and g. wherein said mounting base has four female mounting members being press fit buttons on a top end, wherein said holder base includes a back end having four male mounting members located thereon, wherein said four male mounting members are mounted onto said four female mounting members.

* * * * *